United States Patent
Ivashin et al.

(10) Patent No.: US 8,325,216 B2
(45) Date of Patent: Dec. 4, 2012

(54) REMOTE CONTROL OF VIDEOCONFERENCE CLIENTS

(75) Inventors: Victor Ivashin, Danville, CA (US); Steve Nelson, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 1318 days.

(21) Appl. No.: 12/037,755

(22) Filed: Feb. 26, 2008

(65) Prior Publication Data

US 2009/0213205 A1    Aug. 27, 2009

(51) Int. Cl.
  *H04N 7/14*   (2006.01)
  *G06F 15/16*   (2006.01)

(52) U.S. Cl. ..................................... 348/14.09; 709/204

(58) Field of Classification Search .... 348/14.01–14.09; 709/204
See application file for complete search history.

(56) References Cited

U.S. PATENT DOCUMENTS

| | | | |
|---|---|---|---|
| 5,767,897 A * | 6/1998 | Howell | 348/14.07 |
| 7,092,821 B2 | 8/2006 | Mizrahi et al. | |
| 7,102,643 B2 | 9/2006 | Moore et al. | |
| 7,990,410 B2 * | 8/2011 | Mock et al. | 348/14.01 |
| 2003/0191805 A1 * | 10/2003 | Seymour et al. | 709/204 |
| 2004/0008249 A1 * | 1/2004 | Nelson et al. | 348/14.09 |
| 2004/0252185 A1 * | 12/2004 | Vernon et al. | 348/14.08 |
| 2006/0252547 A1 | 11/2006 | Mizrahi et al. | |

* cited by examiner

*Primary Examiner* — Curtis Kuntz
*Assistant Examiner* — Sunita Joshi

(57) ABSTRACT

Computer-readable media, having corresponding methods and apparatus, embodies instructions executable by a first computer to perform a method comprising: executing a first videoconference client application, wherein the first videoconference client application exchanges first audiovisual data with a videoconference server application during a videoconference; sending action commands to a second videoconference client application executing on a second computer, wherein the second videoconference client application exchanges second audiovisual data with the videoconference server application during the videoconference; and wherein the second videoconference client application operates according to the action commands during the videoconference.

18 Claims, 6 Drawing Sheets

REMOTE CONTROL OF VIDEOCONFERENCE CLIENTS

BACKGROUND

The present invention relates generally to videoconference applications, and in particular to remote control of one videoconference client by another.

Conference participants are often too busy with their respective collaboration goals to be simultaneously burdened by operation of complex devices such as projectors, lights, microphones, speakers, and the like. Unfortunately many of these devices are necessary, and directly impact content contribution and reception. Ideally, the interfaces and apparatus of a conference system should be transparent to the attendees utilizing the system. This is particularly true for a participant tasked with presentation, since the formal communication style demands focus be directed on his topic and his audience, rather than on the system components tasked with enabling the communication. Continual manipulation of conferencing devices distracts from the intended experience, often drawing attention away from the meeting topic and onto the limitations of the communication technology or the limitations of the operator. Neither is acceptable.

To mitigate such burdens in live conferences, proactive steps are often taken to ensure success. This may include preparation of the conference meeting room with validation of working equipment, for example by conducting sound checks. Presenters may further employ an assistant to operate the conference devices during the conference. This takes an extra burden off the presenter who can thus focus more on his presentation duties. The assistant works in concert with the presenter, for example by changing slides, adjusting volume levels, and the like, to enhance the presentation experience for all participants.

For videoconferences, the burdens are increased as the collaboration systems themselves become more complex, and one must manage the collaborative exchange among distant attendees. While presenting content to a remote audience, it is likely to become overly arduous to operate application interface buttons, configure and select operational features, change view modes, or otherwise interact with the videoconference system to ensure adequate content delivery. New or unskilled participants may not even know how to use the necessary features or understand the best available tools, even with the most simplistic videoconference systems, to effectively communicate during the course of the meeting. A presenter's concentration on the collaboration details may lead to misplaced videoconference system selections, which can dramatically affect the communication or its impact. The presenter's attention to the videoconference system devices and features may lead to unwanted distractions and interruptions in the meeting flow.

While the presenter's videoconference application could be physically controlled directly by an assistant sitting at the same computer terminal with the presenter, such proximity is not always available or desired. The presenter and assistant may be in different rooms or locations. A feature that allows another knowledgeable participant in the meeting to assist, remotely or otherwise, would prove useful.

SUMMARY

In general, in one aspect, an embodiment features computer-readable media embodying instructions executable by a first computer to perform a method comprising: executing a first videoconference client application, wherein the first videoconference client application exchanges first audiovisual data with a videoconference server application during a videoconference; sending action commands to a second videoconference client application executing on a second computer, wherein the second videoconference client application exchanges second audiovisual data with the videoconference server application during the videoconference; and wherein the second videoconference client application operates according to the action commands during the videoconference.

Embodiments of the computer-readable media can include one or more of the following features. In some embodiments, the method further comprises: displaying a user interface; and sending the action commands in response to operation of the user interface. In some embodiments, the method further comprises: displaying a director console comprising a plurality of buttons; and sending the action commands in response to activation of the buttons. In some embodiments, the buttons in the director console represent at least one of the group consisting of: an application sharing session adapted to share an application executing on the second computer over the videoconference; a document camera application, executing on the second computer, adapted to provide video of a paper document over the videoconference; a document application, executing on the second computer, adapted to share an electronic document over the videoconference; and a video application, executing on the second computer, adapted to provide video over the videoconference. In some embodiments, the method further comprises: displaying a director console comprising a directed presenter selection window to identify a plurality of participants in the videoconference; and selecting the second videoconference client in response to selection of one of the participants from the presenter selection window. In some embodiments, the method further comprises: displaying a director console comprising a stop controlling button, wherein the first videoconference client sends a stop controlling request to the videoconference server in response to activation of the stop controlling button; wherein when the videoconference server grants the stop controlling request, the videoconference client ceases to send the action commands to the second videoconference client.

In general, in one aspect, an embodiment features an apparatus comprising: a processor adapted to execute a first videoconference client application, wherein the first videoconference client application exchanges first audiovisual data with a videoconference server application during a videoconference; and an output module adapted to send action commands to a second videoconference client application executing on a second computer, wherein the second videoconference client application exchanges second audiovisual data with the videoconference server application during the videoconference; and wherein the second videoconference client application operates according to the action commands during the videoconference.

Embodiments of the apparatus can include one or more of the following features. Some embodiments comprise a display module adapted to generate a display including a user interface; and wherein the output module sends the action commands in response to operation of the user interface. Some embodiments comprise a display module adapted to generate a display including a director console comprising a plurality of buttons; wherein the output module sends the action commands in response to activation of the buttons. In some embodiments, the buttons in the director console represent at least one of the group consisting of: an application sharing session adapted to share an application executing on the second computer over the videoconference; a document camera application, executing on the second computer, adapted to provide video of a paper document over the videoconference; a document application, executing on the second computer, adapted to share an electronic document over the videoconference; and a video application, executing on the second computer, adapted to provide video over the videoconference. In some embodiments, the display includes a director console comprising a directed presenter selection window that identifies a plurality of participants in the videoconference; and the processor selects the second videoconference client in response to selection of one of the participants from the presenter selection window. Some embodiments comprise a display module adapted to generate a display including a director console comprising a stop controlling button; and wherein the output module sends a stop controlling request to the videoconference server in response to activation of the stop controlling button.

In general, in one aspect, an embodiment features a method comprising: executing a first videoconference client application, wherein the first videoconference client application exchanges first audiovisual data with a videoconference server application during a videoconference; sending action commands to a second videoconference client application executing on a second computer, wherein the second videoconference client application exchanges second audiovisual data with the videoconference server application during the videoconference; and wherein the second videoconference client application operates according to the action commands during the videoconference.

Embodiments of the method can include one or more of the following features. Some embodiments comprise displaying a user interface; and sending the action commands in response to operation of the user interface. Some embodiments comprise displaying a director console comprising a plurality of buttons; and sending the action commands in response to activation of the buttons. In some embodiments, the buttons in the director console represent at least one of the group consisting of: an application sharing session adapted to share an application executing on the second computer over the videoconference; a document camera application, executing on the second computer, adapted to provide video of a paper document over the videoconference; a document application, executing on the second computer, adapted to share an electronic document over the videoconference; and a video application, executing on the second computer, adapted to provide video over the videoconference. Some embodiments comprise displaying a director console comprising a directed presenter selection window to identify a plurality of participants in the videoconference; and selecting the second videoconference client in response to selection of one of the participants from the presenter selection window. Some embodiments comprise displaying a director console comprising a stop controlling button, wherein the first videoconference client sends a stop controlling request to the videoconference server in response to activation of the stop controlling button; wherein when the videoconference server grants the stop controlling request, the videoconference client ceases to send the action commands to the second videoconference client.

In general, in one aspect, an embodiment features computer-readable media embodying instructions executable by a computer to perform a method comprising: executing a first videoconference client application, wherein the first videoconference client application exchanges first audiovisual data with a videoconference server application during a videoconference; receiving action commands from a second videoconference client application executing on a second computer, wherein the second videoconference client application exchanges second audiovisual data with the videoconference server application during the videoconference; and executing the first videoconference client application according to the action commands during the videoconference.

Embodiments of the computer-readable media can include one or more of the following features. In some embodiments, in response to the action commands, the first videoconference client application controls at least one of the group consisting of: an application sharing application adapted to share an application executing on the first computer over the videoconference; a document camera application, executing on the first computer, adapted to provide video of a paper document over the videoconference; a document application, executing on the first computer, adapted to share an electronic document over the videoconference; and a video application, executing on the first computer, adapted to provide video over the videoconference. In some embodiments, the method further comprises: displaying a button; and ceasing executing the first videoconference client application according to the action commands after the button is selected.

In general, in one aspect, an embodiment features an apparatus comprising: a processor adapted to execute a first videoconference client application, wherein the first videoconference client application exchanges first audiovisual data with a videoconference server application during a videoconference; and an input module adapted to receive action commands from a second videoconference client application executing on a second computer, wherein the second videoconference client application exchanges second audiovisual data with the videoconference server application during the videoconference; and wherein the processor executes the first videoconference client application according to the action commands during the videoconference.

Embodiments of the apparatus can include one or more of the following features. In some embodiments, in response to the action commands, the first videoconference client application controls at least one of the group consisting of: an application sharing application adapted to share an application executing on the first computer over the videoconference; a document camera application, executing on the first computer, adapted to provide video of a paper document over the videoconference; a document application, executing on the first computer, adapted to share an electronic document over the videoconference; and a video application, executing on the first computer, adapted to provide video over the videoconference. Some embodiments comprise a display module adapted to generate a display including a button; and wherein the processor ceases executing the first videoconference client application according to the action commands after the button is selected.

In general, in one aspect, an embodiment features a method comprising: executing a first videoconference client application, wherein the first videoconference client application exchanges first audiovisual data with a videoconference server application during a videoconference; receiving action commands from a second videoconference client application executing on a second computer, wherein the second videoconference client application exchanges second audiovisual data with the videoconference server application during the videoconference; and executing the first videoconference client application according to the action commands during the videoconference.

Embodiments of the method can include one or more of the following features. In some embodiments, in response to the action commands, the first videoconference client application controls at least one of the group consisting of: an application sharing application adapted to share an application executing on the first computer over the videoconference; a document camera application, executing on the first computer, adapted to provide video of a paper document over the videoconference; a document application, executing on the first computer, adapted to share an electronic document over the videoconference; and a video application, executing on the first computer, adapted to provide video over the videoconference. Some embodiments comprise displaying a button; and ceasing executing the first videoconference client application according to the action commands after the button is selected.

The details of one or more implementations are set forth in the accompanying drawings and the description below. Other features will be apparent from the description and drawings, and from the claims.

Figure 1:
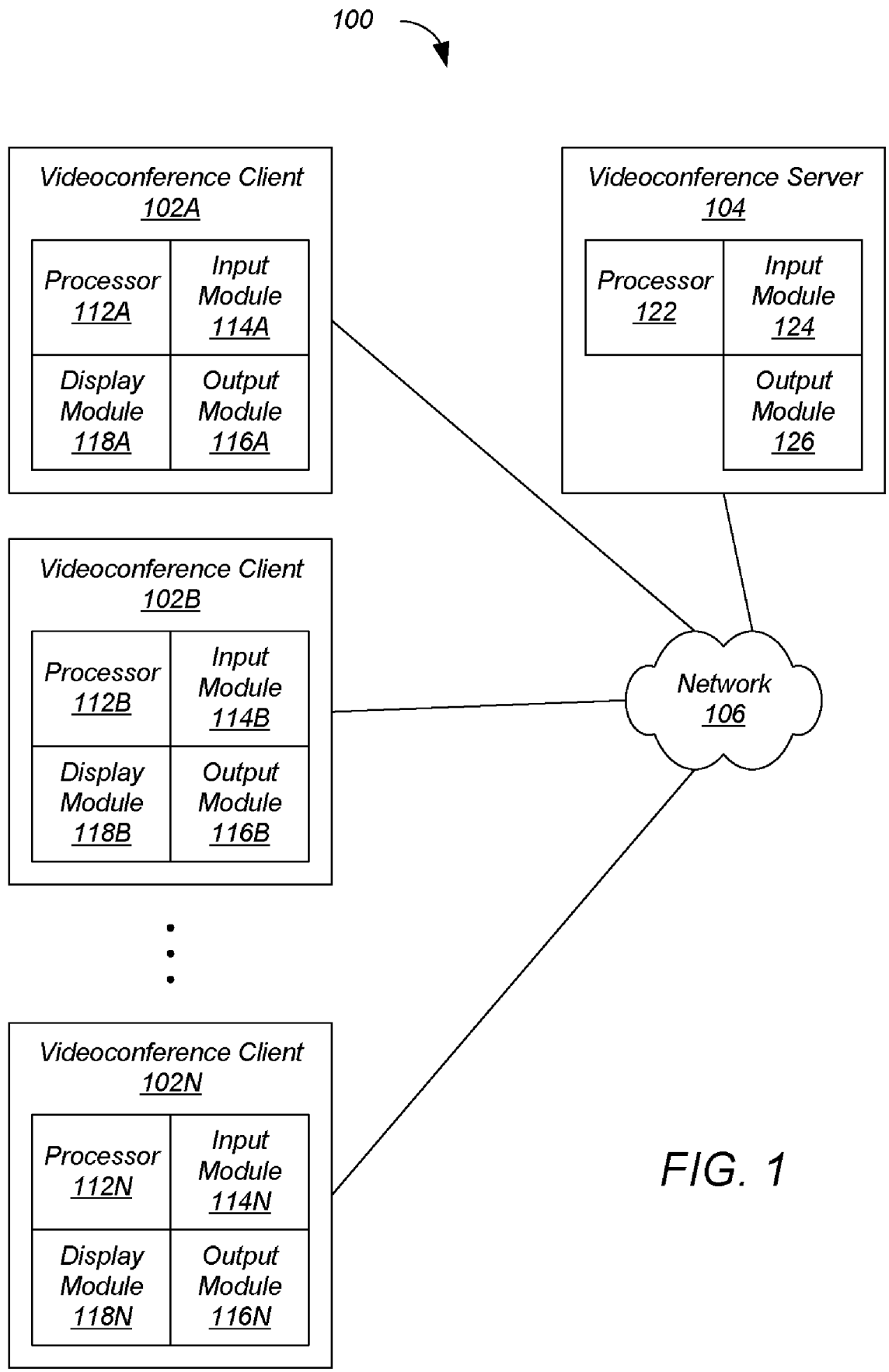
FIG. 1 shows a videoconference system according to one embodiment.

The leading digit(s) of each reference numeral used in this specification indicates the number of the drawing in which the reference numeral first appears.

DETAILED DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

In a videoconference, one of the participants is designated as a "presenter," and uses his videoconference client to present a presentation to the other participants. According to various embodiments, another videoconference participant, referred to herein as a "director," can use his videoconference client to remotely control features within the videoconference client of the presenter, who is then referred to herein as a "directed presenter." The directed presenter's videoconference client remains usable by the directed presenter even while some or all of the videoconference client features remain available to the director. Videoconference participants can request or relinquish director status. The director can manage the assignment and revocation of presenter status to the participants in the videoconference. However, in general, a videoconference can have only one director at a time.

FIG. 1 shows a videoconference system 100 according to one embodiment. Videoconference system 100 includes a plurality of videoconference clients 102A, B-N in communication with a videoconference server 104 over a network 106. Network 106 can be implemented as a wide-area network such as the Internet, a local-area network (LAN), or the like. While embodiments of the present invention are described with respect to network communications, they are equally applicable to devices employing other forms of data communications such as direct links and the like.

Although in the described embodiment, the elements of videoconference system 100 are presented in one arrangement, other embodiments may feature other arrangements, as will be apparent based on this disclosure. For example, the elements of videoconference system 100 can be implemented in hardware, software, or combinations thereof.

Referring to FIG. 1, each videoconference client 102 includes a processor 112, an input module 114, an output module 116, and a display module 118. Videoconference server 104 includes a processor 122, an input module 124, and an output module 126. Each processor 112 of a videoconference client 102 executes a videoconference client application that allows videoconference clients 102 to exchange audio-visual data and the like with each other via videoconference server 104 as part of a videoconference. Processor 122 of videoconference server 104 executes a videoconference server application.

In the example of FIG. 1, the videoconference participant using videoconference client 102A has been designated a director, and the videoconference participant using videoconference client 102B has been designated as a directed presenter. The director can make selections and execute functional operations provided by his videoconference client 102A in lieu of, or on behalf of, the directed presenter.

In response to actions of the director, videoconference client 102A sends action commands to the videoconference client 102B of the directed presenter, which operates according to the action commands during the videoconference. The videoconference client 102B of the directed presenter processes the action commands as though the directed presenter had taken the actions represented by the action commands. The directed presenter can operate his videoconference client 102B as a normal presenter participant, while allowing the director to handle some of the operations.

Figure 2:
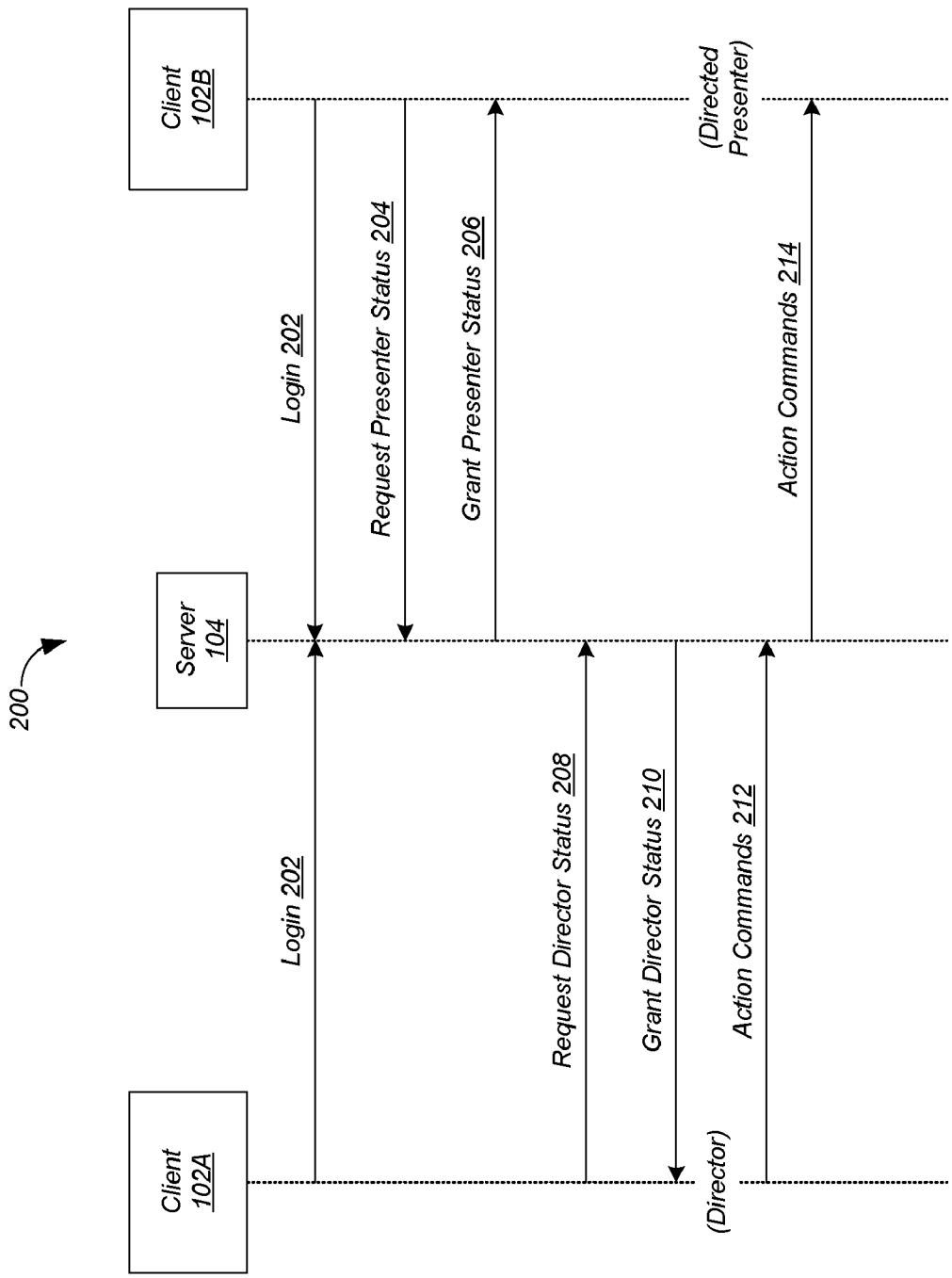
FIG. 2 shows a process for the videoconference system of FIG. 1 according to one embodiment.

FIG. 2 shows a process 200 for videoconference system 100 of FIG. 1 according to one embodiment. Although in the described embodiment, the elements of process 200 are presented in one arrangement, other embodiments may feature other arrangements, as will be apparent based on this disclosure. In various embodiments, some or all of the steps of process 200 can be executed in a different order, concurrently, and the like. For example, while in process 200 a presenter is assigned before a director is assigned, in other cases a director can be assigned before a presenter is assigned. The director can then assign a presenter.

Referring again to FIG. 1, to begin the videoconference, the videoconference participants employ their videoconference clients 102 to log in to videoconference server 104 (step 202). For clarity, only two videoconference clients 102A, B are shown.

Figure 3:
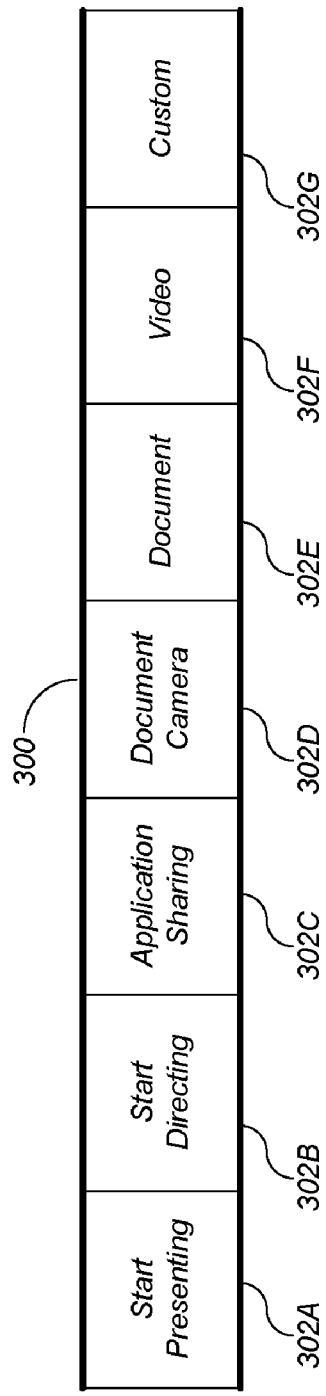
FIG. 3 shows a portion of a control bar according to one embodiment.

After login, one of the videoconference participants chooses to become a presenter, and so employs his videoconference client 102B to request presenter status (step 204). For example, the display module 118 of each videoconference client 102 displays a control bar having a button to request presenter status. FIG. 3 shows a portion of such a control bar 300. Referring to FIG. 3, control bar 300 includes a plurality of control buttons 302A-G. Button 302A, when activated, causes output module 116B to send an action command requesting presenter status to videoconference server 104.

Referring again to FIG. 2, in response to the action command, videoconference server 104 grants presenter status to the participant using videoconference client 102B (step 206). In some cases, multiple participants may request presenter status contemporaneously. In such cases, videoconference server 104 arbitrates to determine to which participant presenter status should be granted.

One of the other videoconference participants then chooses to become a director, and so employs his videoconference client 102B to request director status (step 208). Director status is available to any participant with appropriate rights at the start of the videoconference. Once videoconference server 104 has granted director status to a videoconference participant, the status remains with that participant until that participant releases it or departs the videoconference.

Figure 4:
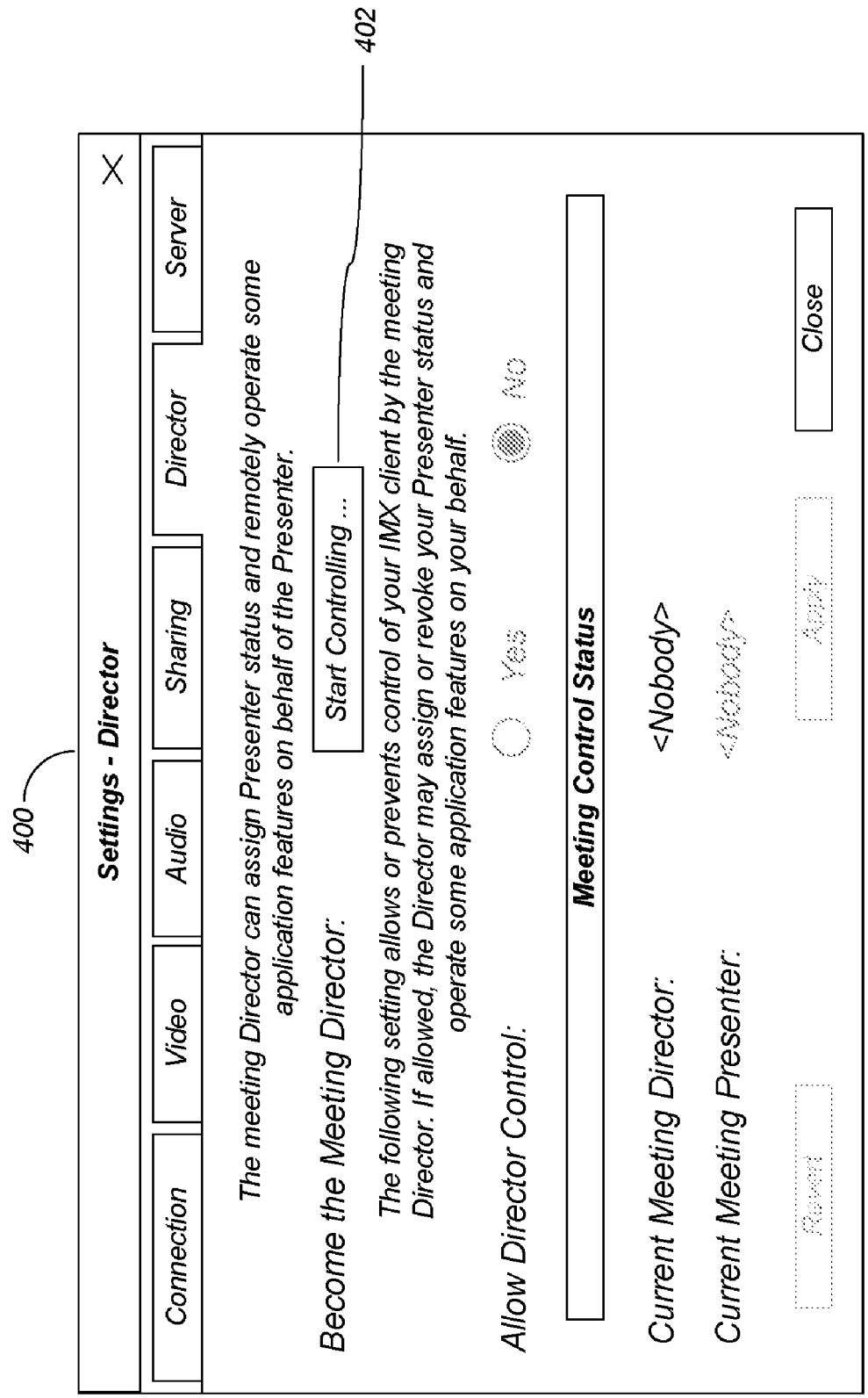
FIG. 4 shows a portion of a settings window according to one embodiment.

Referring to FIG. 3, control bar 300 includes a button 302B that, when activated, causes an action command requesting director status to be sent to videoconference server 104. Alternatively, a participant can use a settings window of his videoconference client 102 to request director status. FIG. 4 shows a portion of such a settings window 400. Referring to FIG. 4, settings window 400 includes a "Start Controlling" button 402. Button 402, when activated, causes output module 116A to send an action command requesting director status to videoconference server 104.

Upon receiving the action command, videoconference server 104 can grant or reject the request for director status. Rejection generally occurs when director status has already been assigned, or when requests are received from multiple participants. In the case of multiple requests, videoconference server 104 can select one of the requests based on priority, order of receipt of the requests, and the like, and grant the selected request while rejecting the others. Rejection may also occur if the videoconference does not allow directors, if the requesting participant is not allowed to become a director due to server-configurable user access rights, and the like. Referring again to FIG. 2, videoconference server 104 grants the request from videoconference client 102A (step 210).

When a participant is granted director status, videoconference server 104 notifies the other videoconference clients 102 of the change in status. The user interfaces of the videoconference client applications react to the notification. For example, the "Start Controlling" button 402 in settings window 400, and the "Start Directing" button 302B in control bar 300, are changed to appear disabled to the non-director participants, and can be changed to "Stop Controlling" and "Stop Directing" functions for the director participant. Other visual markers identifying the director participant can also appear within the videoconference client application user interfaces for the meeting participants. For example, the color of the director's name or iconic representation as displayed in an interface component can change to reflect the director status.

Figure 5:
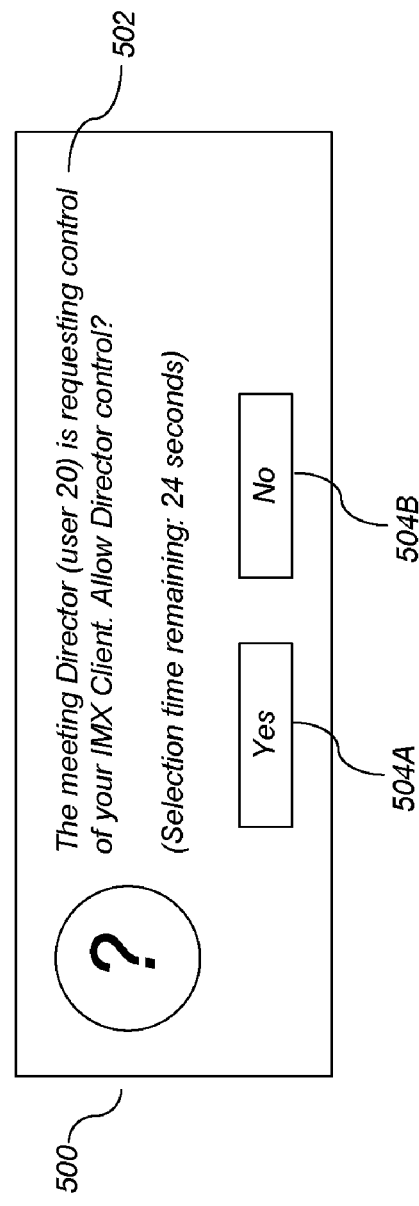
FIG. 5 shows a participant director dialog box according to one embodiment.

Each videoconference client application maintains the identity of the last director assigned in the videoconference, and notifies the user when a change occurs. In this way, if a particular participant becomes a director, releases director status, and regains it again (or otherwise leaves the meeting and rejoins later), other participants will be notified of the participant's director status only once. Of course, if a different participant becomes the director participant, notifications are sent again. For example, when the director changes, the display modules 118 of the non-director videoconference clients 102 display a participant director dialog box. FIG. 5 shows a participant director dialog box 500 according to one embodiment.

Referring to FIG. 5, participant director dialog box 500 includes a query 502 and control buttons 504 to allow the user to select an appropriate director control permission option. In the example of FIG. 5, the user can use control buttons 504A, B to allow or deny director control of the user's videoconference application. If ignored, director change notification window 500 automatically disappears after a short interval, defaulting to a deny director control option.

Figure 6:
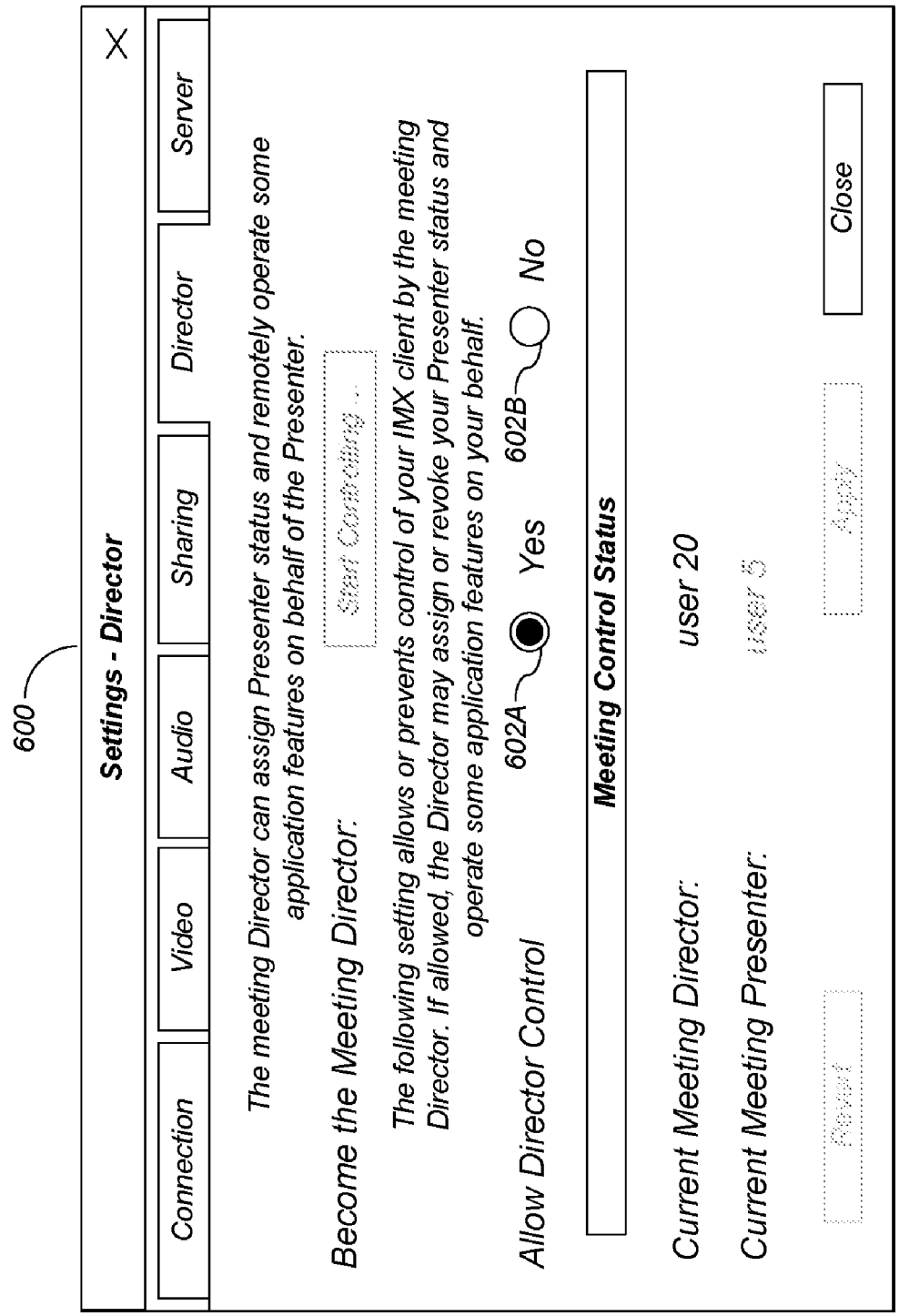
FIG. 6 shows a portion of a settings window according to one embodiment.

The user can modify the chosen director control permission at any time, for example using a settings window. FIG. 6 shows a portion of such a settings window 600. Referring to FIG. 6, settings window 600 includes a pair of "Allow Director Control" radio buttons 602A, B. When "No" button 602B is chosen, the user will not receive participant director dialog box 500, and so cannot be selected as a directed presenter. In addition, if a directed presenter chooses "No" button 602B, the user loses presenter status automatically.

The user interface of each videoconference client 102 can be modified when associated with director status. Some actions may operate differently for a director videoconference client 102. Capabilities can be added or removed. For example, when a participant in a videoconference is assigned director status, controls for assigning or revoking presenter status are disabled in the control bars of the other participants. The director has full control over this assignment. If a participant is presenting when a director is assigned, that presenter must allow the director permission to control his videoconference client 102, or his presenter status is immediately revoked. If the presenter participant chooses to allow director control, he is designated as a directed presenter.

Figure 7:
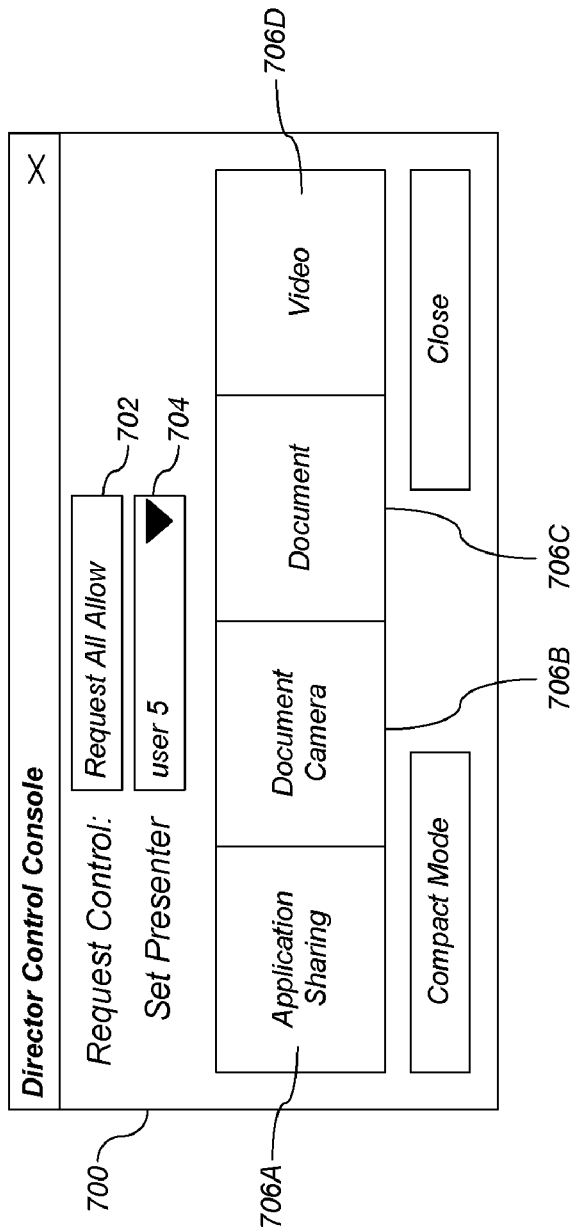
FIG. 7 shows a director control console according to one embodiment.

When a participant attains director status, his videoconference client application provides additional functionality, for example through a director control console or other interface elements. FIG. 7 shows a director control console 700 generated by display module 118A of videoconference client 102A according to one embodiment. Director control console 700 provides an interface for requesting permission to control other videoconference client applications, assigning a directed presenter, sending often-used action commands, and the like.

A Request All Allow button 702 can be used to ask other participants to allow or deny direction. When activated, button 702 causes output module 116A of videoconference client 102A to send an Allow Director Control action command to the other participants. On receipt of the Allow Director Control action command, each videoconference client 102 displays the Participant Director Dialog Box 500 described above. Participants that allow direction appear in a Set Presenter list 704, and may be selected as a directed presenter by the director participant. Set Presenter list 704 can also include a "No one" entry, which can be used to revoke directed presenter status.

Figure 8:
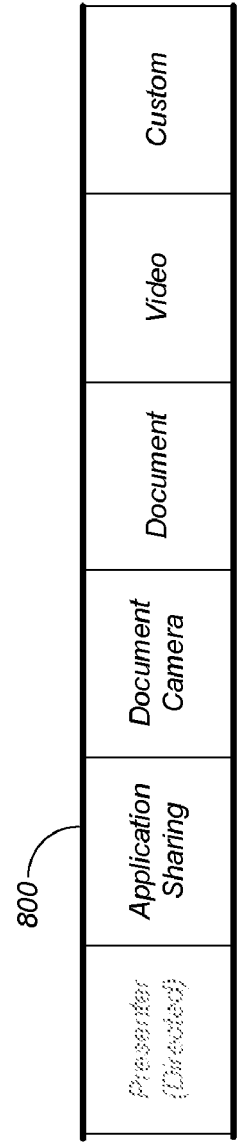
FIG. 8 shows an example of a directed presenter's control bar according to one embodiment.

When a participant becomes a directed presenter, the appearance of the participant's control bar changes. FIG. 8 shows an example of a directed presenter's control bar 800 according to one embodiment. The directed presenter is unable to revoke his presenter status. This is indicated in control bar 800, where the presenter button 802 is displayed as disabled. In directed presenter mode, only the director is allowed to change the presenter's status.

Referring again to FIG. 7, director control console 700 can also include action buttons such as an application sharing button 706A, a document camera button 706B, a document button 706C, a video button 706D, and the like. Each button 706 requests the directed presenter's videoconference client 102 to perform a respective action. Referring again to FIG. 2, when the director activates an action button 706, output module 116 sends one or more action commands to videoconference server 104 (step 212), which sends the action command (s) to the directed presenter's videoconference client 102B (step 214). In response to the action commands, the directed presenter's videoconference client application takes a corresponding action as though evoked by the directed presenter.

For example, application sharing button 706A launches an application sharing session to share an application executing on the directed presenter's videoconference client 102B. Document camera button 706B launches a document camera application on the directed presenter's client application 102B to provide video of a paper document over the videoconference. Document button 706C launches a document application on the directed presenter's client application 102B to share an electronic document over the videoconference. Video button 706D launches a video application on the directed presenter's client application 102B to provide video over the videoconference. Closing director control console 700 revokes the participant's director status and ends controlling. Presenter status is unchanged when the director status is revoked.

To aid the director, some operations can be grouped into a single action command that corresponds to several operations, a defined resulting target state, and the like. These action commands are processed by the directed videoconference client 102B as if the directed participant were controlling the operations locally from the videoconference client 102B. The provided actions can include application sharing, document camera sharing, document/whiteboard, video collaboration, and the like.

Unlike simple view buttons available to presenters, the action buttons 706 in the director control console 700 perform additional operations when pressed. For example, when a presenter presses his local view button to cause a change in the conference view, all other participants in the meeting receive the view change notification, and adjust their application views accordingly. Action buttons 706, however, do more. Each action button 706 represents an intended result, which is conveyed to the directed presenter's videoconference client 102 by one or more corresponding action commands. The directed presenter's videoconference client 102 interprets the received action commands to achieve the intended result. This interpretation can result in multiple operations being taken by the directed presenter's videoconference client 102, and can include consideration of one or more states of directed presenter's videoconference client 102.

For example, a document camera sharing action command instructs the directed presenter's videoconference client 102 to enable the document camera. Many operations may be required to obtain this result. For example, any active application desktop sharing session must be stopped, the application minimized state (if any) should be restored, the conference view may be changed (if necessary), the document camera should be turned on, and sharing of the document camera video should be started. Warning pop-ups or other unnecessary user feedback is repressed during these operations.

As another example, an application sharing action command instructs the directed presenter's videoconference client 102 to perform several operations on behalf of the presenter. First, a change in the conference view is made to ensure that all participants can see the application sharing content. This is the same as the user pressing application sharing view button 302C in control bar 300, with the presenter methods following to instruct the change in conference view. Next, the application sharing feature is started with the desktop source selection enabled. The presenter's videoconference client 102 can also be set to a minimized state to allow for maximum desktop viewing area. Lastly, keyboard and mouse control of the application sharing feature is automatically passed to the director.

For the document and video actions available on director control console 700, the operations needed to change the conference view and shutdown all other activities (i.e. application sharing, etc.) are processed in a similar manner.

Access to some action commands may occur through user interface elements normally hidden or disabled. In such cases, these interface elements are made available to the director when the directed presenter's videoconference client 102 has related elements in use. For example, typically only the participant actively sharing a document camera has access to settings allowing a change to image type (e.g. transmission mode) for the captured data stream. All other participants receive only a view of the processed document camera data stream. A director, however, can have these settings enabled on his videoconference application user interface while a directed presenter is sharing a document camera. When the director selects these interface elements, they operate as if the director were sharing the document camera. However, this operation does not change the local settings of the director's camera. Instead, the operation sends action commands to evoke an action on the user interface of the directed presenter's videoconference client 102. Interface elements in the director's videoconference client 102 can be decorated in some alternate manner to indicate that such elements control settings or affect changes on the directed presenter's videoconference client 102B, rather than on the director's videoconference client 102A.

Each videoconference client 102 generally allows independent selection and configuration of a local conference view by the participant. However, the director can control the conference view for the directed presenter by sending action commands corresponding to the view control buttons. Because the action commands evoke a view control button on the videoconference client 102 of the directed presenter, the change in local conference view automatically causes a change in the other participants' views. This behavior is another result of the disclosed techniques of having the operations for an action processed by the target of the action rather than the source of the action.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A videoconferencing system, comprising:
a first videoconference device having a first user interface including first user-actuated inputs actuating videoconference-related operations within said first videoconference device;
a second videoconference device remote from said first video conference device, and having a second user interface including second user-actuated inputs, said second user-actuated inputs actuating said videoconference-related operations within said first videoconference device;
wherein said first videoconference device is responsive to said first user interface and to said second user interface; and
wherein at least one of said second user-actuated inputs corresponds to a sequence of first user-actuated inputs, and actuation of said at least one of said second user-actuated inputs prompts said first videoconference device to execute said sequence of first user-actuated inputs.

2. The videoconferencing system of claim 1, further comprising a third videoconference device, wherein said videoconference-related operations generate audiovisual data within said first videoconference device, and said audiovisual data is transmitted to, and played by, said third videoconference device.

3. The videoconferencing system of claim 1, wherein:
actuation of one of said first user-actuated inputs activates a third user interface within said first videoconference device including third user-actuated inputs, said third user-actuated inputs controlling features in the execution of a routine resulting from said actuation of one of said first user-actuated inputs;
activation of said third user interface within said first videoconference device activates a fourth user interface within said second videoconference device including fourth user-actuated inputs, said fourth user-actuated inputs corresponding to said third user-actuated inputs, and actuation of any of said fourth user-actuated inputs actuates a corresponding one of said third user-actuated inputs and executed within said first videoconference device; and
said third and second user interface are hidden from said third videoconference device.

4. The videoconferencing system of claim 2, wherein said third videoconference device is prohibited from transmitting commands to said first videoconference device.

5. The videoconferencing system of claim 2, wherein said first videoconference device has directed-presenter status, said second videoconference device has a director status, and said third videoconference device has participant status, wherein:

audiovisual data generated within directed-presenter status videoconference device is transmitted to, and played by, the participant-status videoconference device;
videoconference-related operations generating audiovisual data are executed within the directed-presenter status videoconference device in response to actuation by the director status videoconference device; and
the director status videoconference device selectively exchanges the directed-presenter status and the participant status of said first and third videoconference devices.

6. The videoconferencing system of claim 5, wherein said first videoconference device loses said directed-presenter status in response to said first device refusing to respond to said second user-actuated inputs.

7. A videoconferencing system, comprising:
a first videoconference device having a first user interface including first user-actuated inputs actuating videoconference-related operations within said first videoconference device;
a second videoconference device remote from said first video conference device, and having a second user interface including second user-actuated inputs, said second user-actuated inputs actuating said videoconference-related operations within said first videoconference device;
wherein said first videoconference device is responsive to said first user interface and to said second user interface; and
wherein actuation of at least one of said first user-actuated inputs via said first user interface activates the displaying of a message, and activation of said at least one of said first user-actuated inputs by said second videoconference device suppresses said displaying of said message.

8. The videoconferencing system of claim 1, wherein the second user-actuated inputs correspond to the first user-actuated inputs.

9. The videoconference system of claim 1, wherein the actuation source of said second user-actuated inputs is within said second videoconference device, and actuations of said second user-actuated inputs are processed by said first videoconference device.

10. A videoconferencing method, comprising:
providing a first videoconference client in a first videoconference device having a first user interface including first user-actuated inputs actuating videoconference-related operations within said first videoconference device;
providing a second videoconference client in a second videoconference device remote from said first video conference device, and having a second user interface including second user-actuated inputs, said second user-actuated inputs actuating said videoconference-related operations within said first videoconference device;
wherein said first videoconference device is responsive to said first user interface and to said second user interface; and
wherein at least one of said second user-actuated inputs corresponds to a sequence of first user-actuated inputs, and actuation of said at least one of said second user-actuated inputs prompts said first videoconference device to execute said sequence of first user-actuated inputs.

11. The videoconferencing method of claim 10, further comprising providing a third videoconference client in a third videoconference device, wherein said videoconference-related operations generate audiovisual data within said first videoconference device, and said audiovisual data is transmitted to, and played by, said third videoconference device.

12. The videoconference method of claim 11, wherein:
actuation of one of said first user-actuated inputs activates a third user interface within said first videoconference device including third user-actuated inputs, said third user-actuated inputs controlling features in the execution of a routine resulting from said actuation of one of said first user-actuated inputs;
activation of said third user interface within said first videoconference device activates a fourth user interface within said second videoconference device including fourth user-actuated inputs, said fourth user-actuated inputs corresponding to said third user-actuated inputs, and actuation of any of said fourth user-actuated inputs actuates a corresponding one of said third user-actuated inputs and executed within said first videoconference device; and
said third and second user interface are hidden from said third videoconference device.

13. The videoconferencing method of claim 11, wherein said third videoconference device is prohibited from transmitting commands to said first videoconference device.

14. The videoconferencing method of claim 11, wherein said first videoconference device has directed-presenter status, said second videoconference device has a director status, and said third videoconference device has participant status, wherein:
audiovisual data generated within directed-presenter status videoconference device is transmitted to, and played by, the participant-status videoconference device;
videoconference-related operations generating audiovisual data are executed within the directed-presenter status videoconference device in response to actuation by the director status videoconference device; and
the director status videoconference device selectively exchanges the directed-presenter status and the participant status of said first and third videoconference devices.

15. The videoconferencing method of claim 14, wherein said first videoconference device loses said directed-presenter status in response to said first device refusing to respond to said second user-actuated inputs.

16. The videoconferencing method of claim 10, wherein actuation of at least one of said first user-actuated inputs via said first user interface activates the displaying of a message, and activation of said at least one of said first user-actuated inputs by said second videoconference device suppresses said displaying of said message.

17. The videoconferencing method of claim 10, wherein the second user-actuated inputs correspond to the first user-actuated inputs.

18. The videoconferencing method of claim 10, wherein the actuation source of said second user-actuated inputs is within said second videoconference device, and actuations of said second user-actuated inputs are processed by said first videoconference device.

* * * * *